Oct. 15, 1935.        C. H. CRAWLEY        2,017,812
HYDRAULIC BRAKE FITTING
Filed March 18, 1933        2 Sheets-Sheet 1

Inventor
CHARLES H. CRAWLEY
Richey & Watts
Attorneys

Oct. 15, 1935.  C. H. CRAWLEY  2,017,812
HYDRAULIC BRAKE FITTING
Filed March 18, 1933     2 Sheets-Sheet 2
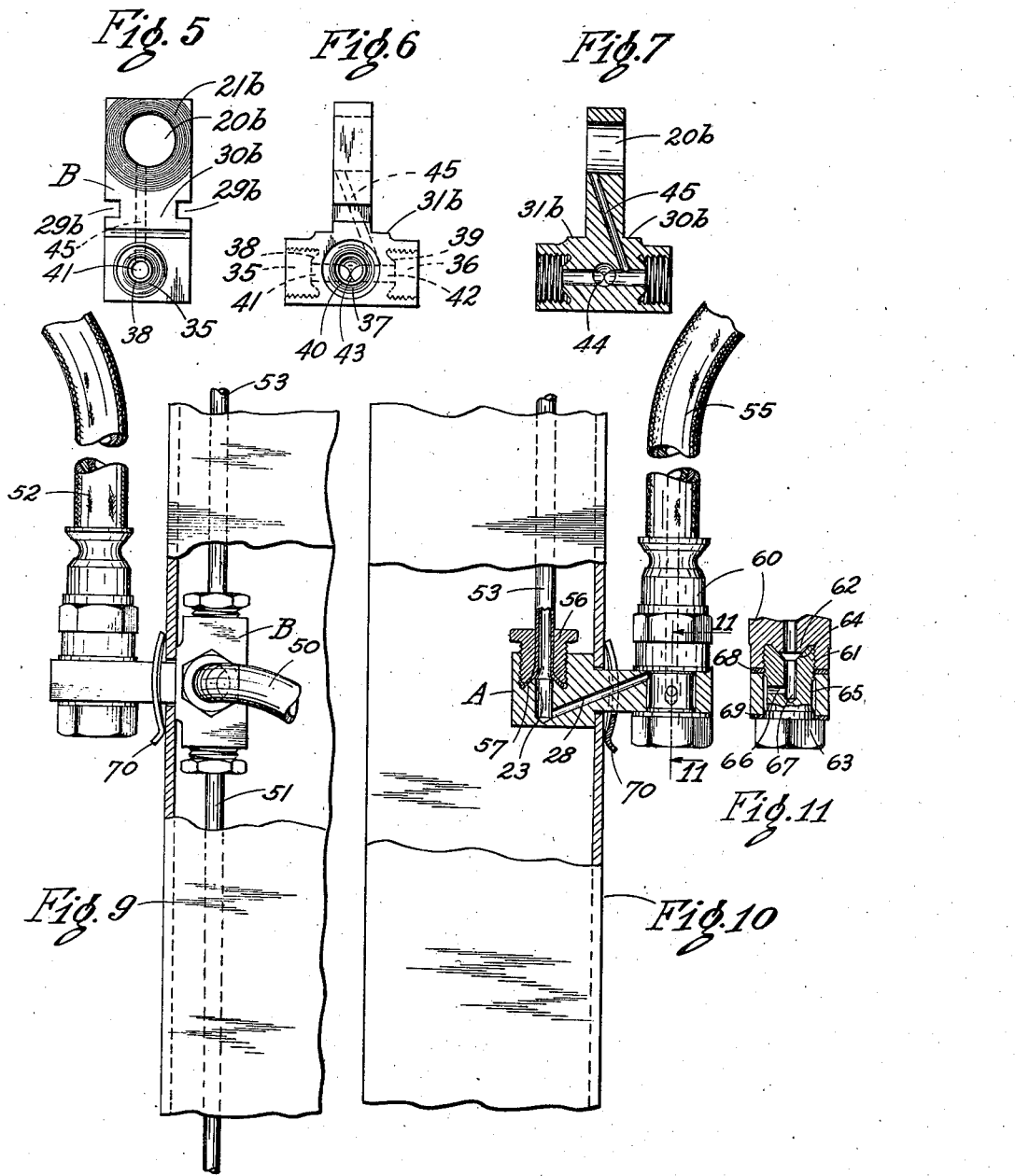
Inventor
CHARLES H. CRAWLEY
By Richey & Watts
Attorneys

UNITED STATES PATENT OFFICE 2,017,812

HYDRAULIC BRAKE FITTING

Charles H. Crawley, Lakewood, Ohio, assignor, by mesne assignments, to The Weatherhead Company, Cleveland, Ohio, a corporation of Ohio Application March 18, 1933, Serial No. 661,549

7 Claims. (Cl. 285—209)

This invention relates to fittings such as are used in hydraulic brake systems for automobiles and particularly relates to a fitting which is adapted to conduct the brake actuating fluid through a member of the frame of the car and at the same time to form a connection between a metallic tube and a flexible non-metallic hose.

In hydraulic brake systems for automobiles it is customary to conduct the actuating fluid to various points on the frame adjacent the wheels by means of copper or steel tubes, and to make the connection to the brake operating cylinders carried by the wheels through flexible rubber hoses. In order to protect the copper tubes as much as possible, it is desirable to run the tubes inside of the frame members where they are protected from damage of any sort. Heretofore it has been the practice, as illustrated in the prior application Serial No. 515,258, filed February 12, 1931, by Albert J. Weatherhead, Jr. to extend the copper tubes through openings in the frame and then to make the connection between the copper tube and the rubber hose by means of a coupling member which is supported by a bracket riveted to the frame. This is a very satisfactory method but the installation of the brackets and the various couplings involves a considerable amount of expense.

It is therefore an object of my invention to provide a fitting which is adapted to extend through a frame member of a motor car and to act as a connection between fluid conducting conduits on opposite sides of the member. Another object is to provide a one-piece fitting having spaced means for connection to a copper tube and to a rubber hose parallel thereto. Another object is to provide a fitting adapted to conduct fluid through a frame member of an automobile and having provision at one end thereof for connection to a plurality of copper tubes and at the other end thereof provision for connection to a rubber hose. Another object is to provide a fitting which can be manufactured rapidly and economically, and from a minimum amount of stock. A further object is to provide a method of making such fittings rapidly and efficiently.

Other objects and advantages of my invention will become apparent from the following description of preferred forms thereof, reference being had to the accompanying drawings. The essential characteristics are summarized in the claims.

Figure 1:
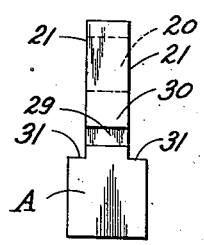
Figure 2:
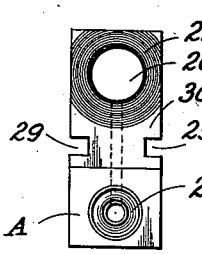
Figure 3:
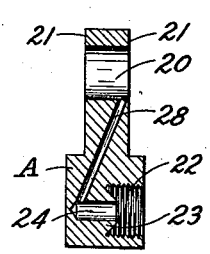
Figure 4:
Figure 8:
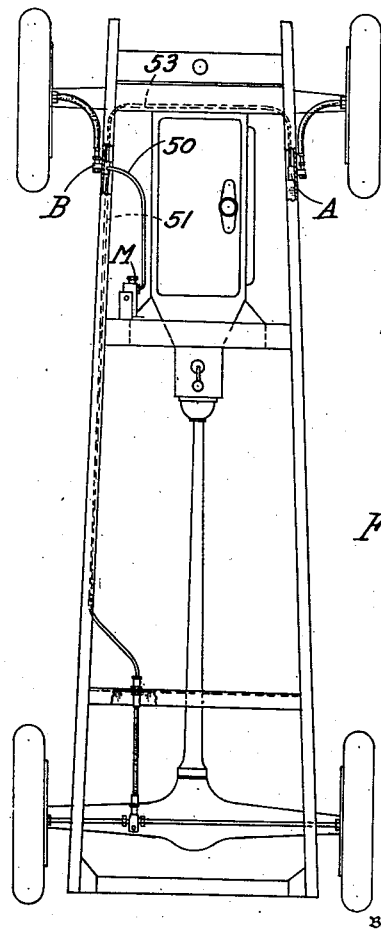

In the drawings, Figure 1 is a side elevation of a fitting made according to my invention; Fig. 2 is a front elevation thereof; Fig. 3 is a vertical section through the fitting illustrated in Figs. 1 and 2; Fig. 4 illustrates a method for drilling an oblique passageway in the fitting; Fig. 5 is a front elevation of a different type of fitting embodying my invention; Fig. 6 is a side elevation of the fitting shown in Fig. 5; Fig. 7 is a vertical section through the modified form of my fitting; Fig. 8 is a somewhat diagrammatic showing of the chassis of an automobile embodying a hydraulic brake system in which my fittings are employed; Fig. 9 is an enlarged section showing one form of my fitting as it is used on an automobile; Fig. 10 is a section illustrating an application of the other form of my fitting; and Fig. 11 is a section taken along the line 11—11 of Fig. 10.

As shown in Figs. 1 to 3, inclusive, the fitting A may be formed from an extruded brass rod having the general shape illustrated in Fig. 1. The rod is cut to proper lengths to form fittings and thereafter the cylindrical hole 20 may be drilled through the upper part of the fitting to provide for a connection to a rubber hose. The faces of the fitting surrounding the hole may be provided with circumferential grooves as at 21 to make a fluid tight connection with a washer. In the lower and thicker part of the fitting, I may form a copper tube connection which preferably comprises a threaded opening 22 having a conical seat 23, and a passageway 24 extending inwardly from the center of the conical seat. This construction and the particular formation of the coupling are fully described in the Weatherhead Patent No. 1,733,925, and will not be further discussed herein.

In order to make a fluid connection between the parallel openings 20 and 22 and at the same time to preserve the solid exterior walls surrounding the openings and thereby eliminate the necessity for plugs or similar devices. I employ the method diagrammatically illustrated in Fig. 4 of the drawings, in which the fitting A is mounted upon a jig having a suitable support 25 and a rod 26 which extends through the opening 20 of the fitting. The rod 26 is provided with a hardened bushing 27 which is adapted to guide a drill D at the correct angle to form a connecting passageway 28 extending from the cylindrical opening 20 to the passageway 24.

At any convenient stage of the manufacturing operation, the slots 29 can be milled or otherwise formed in the shank 30. These slots are adapted to receive a resilient locking clip of the type disclosed in the Baldwin Patent No. 1,875,209, issued August 30, 1932, and which cooperates with the shoulders 31 to hold the fitting securely in place in the frame of an automobile.

It will be seen that there is no unnecessary waste of material in the manufacture of my fitting, and that the manufacturing operations are very simple and can be readily and rapidly carried out. By reason of the obliquely drilled passageway, it is possible to provide a fluid connection between the parallel openings and also to make a one-piece fitting and to avoid the use of plugs or similar devices.

In Figs. 5, 6 and 7, I have illustrated a modified form of fitting which is adapted to make connection with three copper tubes and one rubber hose. The upper portion of the fitting B is provided with an opening 20b surrounded by circumferential grooves 21b substantially similar to the construction of the upper portion of the fitting A. The lower portion of the fitting, however, is provided with three copper tube connections two of which, indicated by 35 and 36, extend parallel to the opening 20b and the third of which, indicated by 37, extends at right angles to the openings 35 and 36 and lies in a plane parallel to but spaced away from the plane of the axis of the opening 20b. The openings 35, 36 and 37 are provided with conical seats 38, 39 and 40, respectively, and passageways 41, 42 and 43, respectively, extend from the centers of the cones to a central zone 44 (see Fig. 7). A connecting passageway 45 extends obliquely from the opening 20b to the passageway 42. The drilling operation may be carried out by means of a jig similar to that shown in Fig. 4. The shank 30b is provided with slots 29b and shoulders 31b so that the fitting may readily be secured in a frame by means of the Baldwin clip.

It will be seen that the fitting can be readily formed with very little waste of material from a bar having the general section illustrated in Fig. 7, by merely cutting off the bar to the proper length to form the fitting and thereafter carrying out the drilling and tapping operations. It is to be particularly noted that the openings 35, 36 and 37 all extend in directions substantially perpendicular to the axis of the shank 31b. By this arrangement, a most efficient use is made of the stock in the bar and practically no material is wasted. Such construction is made possible by the obliquely drilled passageway 45 which permits of solid walls surrounding the various openings and makes it unnecessary to provide an opening extending directly toward the opening 20b.

In Figs. 8 to 11, inclusive, I have illustrated the application of my fittings to a hydraulic brake system for an automobile. A connection from the master brake cylinder M to the fitting B at the left front side of the frame of the automobile may be made by means of a copper tube 50 which, as illustrated in Fig. 9, extends into the opening 37 on the top of the fitting B. From the fitting B, the actuating fluid is distributed by a copper tube 51 to the rear wheels of the vehicle, and by means of the rubber hose 52, to the left front wheel. The copper tube 53 extends forwardly from the fitting B along the inside of the frame to the front cross member 54 and then along the inside of the right hand frame member to the fitting A. There the fluid is passed through the frame through the passageway 28 to the rubber hose 55 which leads to the right front wheel.

The copper tube may be connected to the fitting A, in the usual manner, by means of a nut 56 which clamps the flanged end 57 of the copper tube against the conical seat 23. The connection between the fitting A and the rubber hose may be made through a metallic coupling member 60 which is provided with an internally threaded opening 61 and a conical seat 62. This coupling is secured to the fitting A by means of a bolt 63 having an inverted conical end surface 64, a recessed portion 65 which permits fluid to flow around the shank of the bolt and passageways 66 and 67 leading from the recessed portion to the base of the conical surface 64. Washers 68 and 69 prevent leakage from taking place between the circumferential grooved surfaces 21 surrounding the opening 20, the end of the coupling member 60, and the head of the bolt 63. The connections between the copper tubes and the member B, and between the rubber hose 52 and the member B may be made in the same manner as that described with reference to the member A.

The fittings may be quickly and easily secured in openings in the frame by means of the arched resilient clips 70 which lie within the slots 29 and 29b and hold the shoulders of the fittings against the interior of the frame members. These clips are made in accordance with the disclosure of the Baldwin patent referred to above and will not be described in detail herein.

From the foregoing description of preferred forms of my invention, it will be seen that I have provided hydraulic brake fittings which can be easily and cheaply manufactured with a minimum waste of material. With my fittings, it is possible to install the metallic tubes of a hydraulic brake system within the frame of the automobile and to conduct the actuating fluid through the frame by means of the fittings and to support the hose connections from the fitting, thereby doing away with the necessity of brackets or other supporting devices. My fitting can be quickly and easily secured to the frame of an automobile and will make leak-proof joints with hoses and metallic tubes.

It will be obvious to those skilled in the art that various changes and modifications can be made in my invention without departing from the spirit thereof. The present specification discloses only preferred forms of my invention and it is to be understood that the scope of my patent it not limited by the description contained herein or in any manner other than by the appended claims, when given the range of equivalents to which they may be entitled.

The method disclosed herein is claimed in my divisional application Serial No. 40,459, filed September 13, 1935.

I claim:—

1. A fitting of the character described, having end portions, a shank portion adapted to extend through a supporting member, a recess in one end portion, a conical seat within said recess and an axial passageway extending through said conical seat, a cylindrical opening in the other end portion extending parallel to said axial passageway, and a communicating passageway extending obliquely through said shank from the inner surface of said cylindrical opening to said axial passageway.

2. A fitting of the character described, having end portions, a shank portion adapted to extend through a supporting member, openings in both ends adapted for connection to fluid conducting members, said openings extending substantially perpendicular to the axis of said shank, the external walls surrounding said openings being solid, and a fluid passageway extending obliquely between said openings and through said shank.

3. A fitting of the character described, having end portions, a shank portion adapted to extend through a supporting member, openings in both ends adapted for connection to fluid conducting members, said openings extending substantially perpendicular to the axis of said shank, the external walls surrounding the openings being solid, and a fluid passageway extending between said openings and through said shank.

4. A one-piece hydraulic brake fitting having a shank portion adapted to extend through a supporting member, an opening in one end of said fitting adapted for connection to a metallic tube, an opening in the other end of said fitting adapted for connection to a non-metallic hose, both of said openings extending substantially perpendicular to the axis of said shank, and a fluid passageway extending between said openings and obliquely through said shank.

5. A fitting of the character described, having end portions, a shank portion adapted to extend through a supporting member, an opening in one end adapted for connection to a metallic tube, an opening in the other end adapted for connection to a rubber hose, the axes of said openings being parallel, the external walls surrounding said openings being solid, and a fluid passageway extending between said openings and obliquely through said shank.

6. A fitting of the character described, having a shank adapted to extend through a supporting member, an enlarged end portion adapted to engage the supporting member, another end portion of substantially the same external dimensions as the shank, a plurality of openings in said enlarged end portion, said openings being adapted for connection to metallic tubes, an opening in the other end adapted for connection to a rubber hose fitting, and a fluid passageway communicating with each of said openings and extending obliquely through said shank.

7. A fitting of the character described, having a shank adapted to extend through a supporting member, an enlarged end portion adapted to engage the supporting member, another end portion of substantially the same external dimensions as the shank, a plurality of openings in said enlarged end portion, said openings being adapted for connection to metallic tubes, an opening in the other end adapted for connection to a rubber hose fitting, each of said openings extending in a direction substantially perpendicular to said shank, a fluid passageway communicating with each of said openings and extending obliquely through said shank.

CHARLES H. CRAWLEY.